F. R. PROCUNIER.
AUTOMOBILE BUMPER.
APPLICATION FILED FEB. 5, 1920.
1,352,220.
Patented Sept. 7, 1920.
4 SHEETS—SHEET 3.
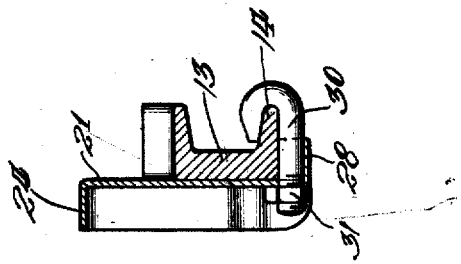
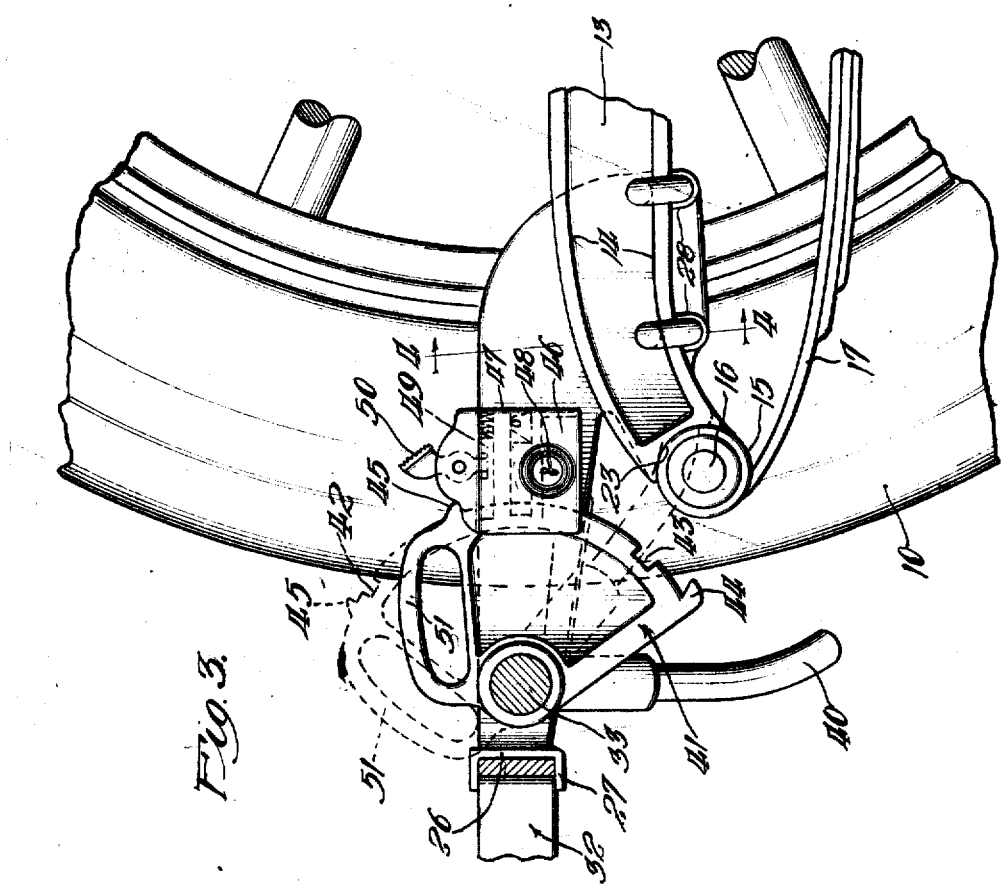
Witness:
Stephen F. Kebra
INVENTOR
Frank R. Procunier.
ATTORNEYS

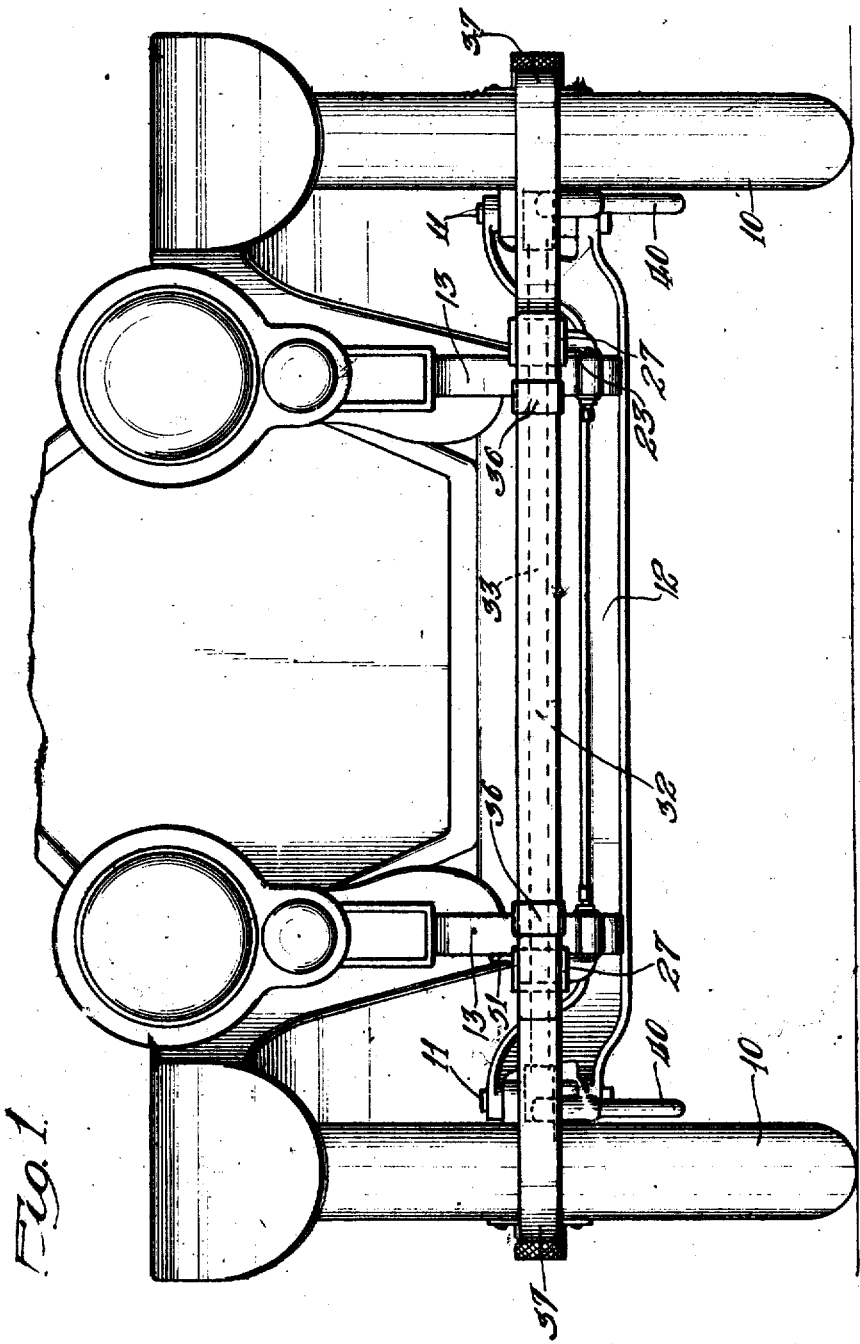

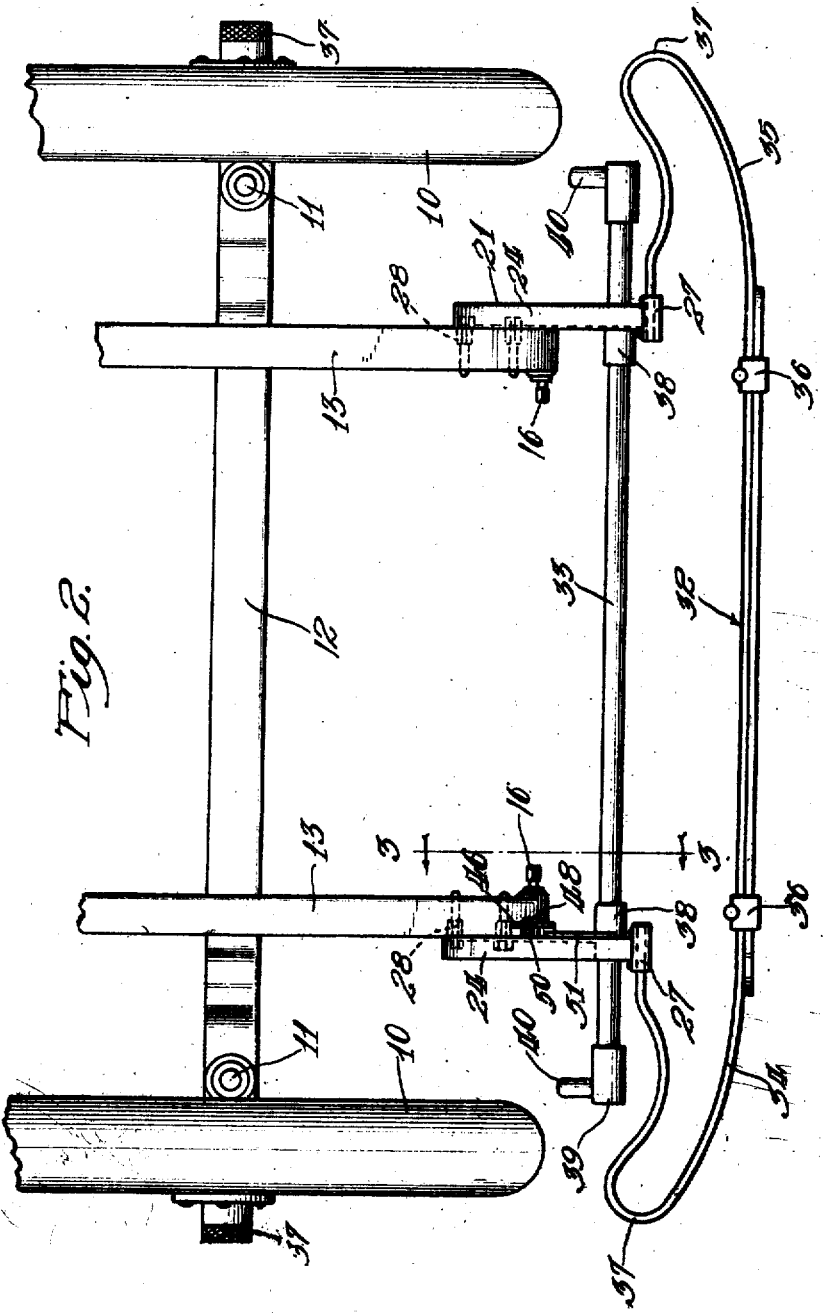

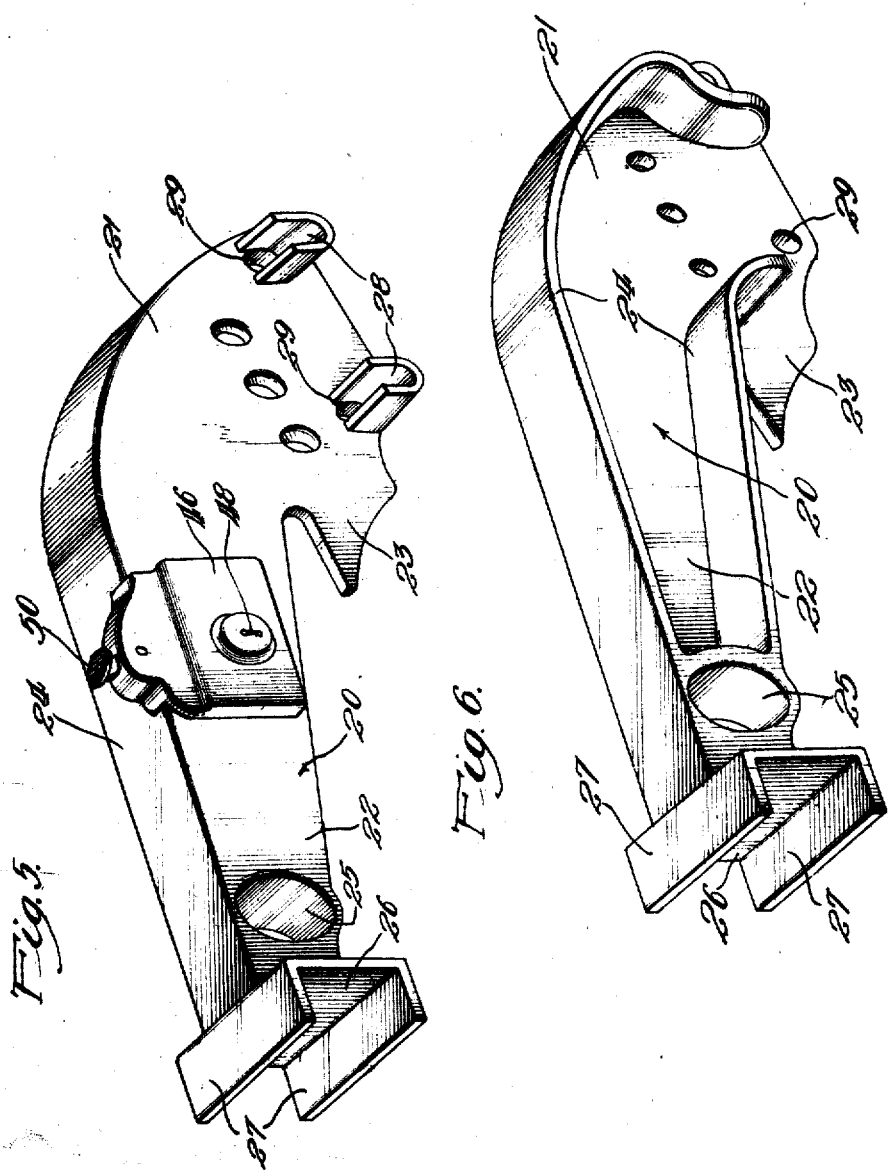

UNITED STATES PATENT OFFICE.

FRANK R. PROCUNIER, OF CHICAGO, ILLINOIS, ASSIGNOR OF ONE-FOURTH TO JESSE C. STRYKER, ONE-FOURTH TO LOUIS N. TURNER, AND ONE-FOURTH TO LOUIS H. NISSEN, ALL OF CHICAGO, ILLINOIS.

AUTOMOBILE-BUMPER.

1,352,220.   Specification of Letters Patent.   Patented Sept. 7, 1920.

Application filed February 5, 1920. Serial No. 356,537.

*To all whom it may concern:*

Be it known that I, FRANK R. PROCUNIER, a citizen of the United States, residing at Chicago, in the county of Cook and State of Illinois, have invented certain new and useful Improvements in Automobile-Bumpers, of which the following is a specification.

This invention relates to a bumper adapted to be mounted upon the front of an automobile, and more particularly to certain improvements by which the bumper bar may be turned from one position to another to project a pair of locking elements between the front wheels to prevent their being turned for steering purposes. In certain respects this invention discloses parts that are similar to those described in my Patent No. 1,245,124, granted October 30, 1917.

An exemplification of this invention in its preferred form is illustrated in the accompanying drawing in the manner following:

Figure 1 is a front elevation of an automobile equipped with my improved bumper;

Fig. 2 is a plan view of the front part of an automobile showing the bumper in place;

Fig. 3 is an enlarged transverse section taken on line 3—3 of Fig. 2;

Fig. 4 is a detail in transverse section taken on line 4—4 of Fig. 3; and

Figs. 5 and 6 are two views in perspective showing the two brackets that connect the bumper to the automobile frame.

The parts of an automobile that are represented in the drawings include the two front wheels 10, each arranged to steer by swiveling around a pin 11 suitably mounted on the front axle 12 that is carried by the two side frames 13. For purposes of strength these frames are usually of channel formation with upper and lower flanges 14, the forward end of each frame being curved slightly down and having at its extremity a web from which extends laterally a boss 15 formed with an opening therethrough for receiving a bolt 16 that connects with a spring 17. The construction just described is common to most automobiles and has been alluded to only because the present bumper is designed to coöperate in a special manner with such parts.

Referring now to Figs. 5 and 6, I have illustrated two brackets 20 that connect the bumper to the automobile, one bracket being attached to each frame. These two brackets are substantially alike, and in the drawing their both sides are accordingly shown. In form each bracket comprises a body 21 from which extends forwardly a neck 22 below which is also a shoulder 23 that is suitably shaped to abut one of the frame bosses 15 so as to derive support therefrom. The bracket may be reinforced by providing marginal flanges 24 as shown, which near the front end are shaped in the form of a cylindrical bearing 25 forward of which is a head 26 provided with upper and lower ears 27 presenting in effect a channel formation. At the rear end of the bracket, upon that side of its body which is opposite to the flanges 24, are two or more laterally extending channeled lugs 28 in register with openings 29 formed through the bracket body.

In Figs. 3 and 4 the manner of attaching a bracket so formed to one of the channeled frames of the automobile is clearly represented. For securing the bracket in place, I use two or more hook bolts 30, one arranged through each opening 29, with its shank disposed within the associated lug 28, the hook end of each bolt catching on to the lower flange 14. By tightening a nut 31 upon the opposite end of the bolt against the proximate face of the frame the bracket is held rigidly in place. The advantage of this construction resides in the simplicity and ease with which the bracket may be attached or taken off, and in the secure fastening that results from the clamping of two or more hook bolts upon the frame flange, resting the shoulder 23 on the boss 15, and the underlapping of the frame by the lugs 28. It is plain that the bolts serve principally to hold the bracket in proper relation to the frame such that support for the bracket is derived almost entirely from other sources.

The bumper proper is duplex in character, one part being arranged ahead of the other, the numerals 32 and 33 being used to designate these two parts respectively (see Fig. 2). The forward bumper is preferably resilient and may consist of two spring bars 34 and 35 overlapping in the region of the front center and provided with suitable clamps 36 for maintaing them in a fixed adjustment relative to each other. Each bar is suitably turned back on itself as at 37 to present its end between the ears 27 of the head 26 of one of the brackets 20, any appropriate means being employed for locking the bar ends in place upon the bracket heads. The bumper 32 just described is fixedly held in position just forward of the second bumper element 33 which may be in the form of a pipe or rod mounted to turn about a horizontal axis. For this purpose the bar 33 is journaled within the two bearings 25, one provided in each bracket 20, in which endwise movements may be prevented as by the use of collars 38, as shown. Upon each end of the bar 33 I have secured a sleeve 39 from which projects laterally an arm 40 that may swing in a plane just inwardly of the proximate wheel 10, the effect being, when swung rearwardly (as shown by the dotted lines in Fig. 3) to interfere with steering movements of the two forward wheels of the vehicle.

Referring now to Fig. 3, upon one of the collars 38 is carried a laterally projecting segmental plate 41 notched in two places as at 42 and 43, and provided with two stop shoulders 44 and 45. The curved edge of this plate is received within one side of a housing 45 that may be formed integral with one of the brackets 20, the plate being in juxtaposition to its neck 22. Arranged within the housing 46 is a spring actuated locking bolt 47 adapted to enter into the lower notch 43 when the bumper bar is turned to a position where the two arms 40 interfere with steering movements of the wheels 10. For preventing normal retraction of the bolt a suitable lock 48 may be provided, adapted to be operated only by use of a proper key. Means are also provided for holding the bumper bar in normal operating position with the two arms 40 free of the front wheels, and for this purpose, I have shown a second spring actuated bolt 49 adapted to enter the upper notch 42 only when the parts are related as shown by full lines in Fig. 3, a trigger 50 being provided for manually withdrawing this bolt 49 when it is desired to lock the vehicle. The two stops 44 and 45 coöperate with the upper and lower sides of the housing, for the purpose of confining within proper limits the swinging movements of the bumper bar, which are facilitated by grasping a handle 51 arranged as shown.

The construction that has been described represents a preferred embodiment of my invention. Changes or modifications from the exact form shown may, of course, be made, but in so far as such modifications follow the spirit of my invention as defined by the appended claims, I desire that they should be included within the scope of this patent.

I claim:

1. In combination with a vehicle having a pair of longitudinal channel frames each of which is provided at its forward end with a laterally extending boss, a bumper carried upon said frames at their forward ends, and means for mounting the bumper upon the frames comprising a pair of brackets, one for each frame, each formed with a laterally projecting channeled lug adapted to underlie the frame, there being in the bracket an aperture registering with the channel in each lug, a hook bolt extended through each aperture and disposed within the associated channeled lug, the hooked end of the bolt being engaged with the lower flange of the channel frame, and a shoulder extended forwardly and downwardly from the bracket in abutting relation to the frame boss for supporting the bracket in place, substantially as described.

2. In combination with a vehicle having a pair of longitudinal channel frames each of which is provided at its forward end with a laterally extending boss, a bumper carried upon said frames at their forward ends, and means for mounting the bumper upon the frames comprising a pair of brackets, one for each frame, each formed with a laterally projecting lug adapted to underlie the frame, and with a shoulder projecting forwardly in abutting relation to the frame boss for supporting the bracket in place, and means for holding the bracket to the frame for receiving support therefrom, substantially as described.

3. In combination with a vehicle having a pair of longitudinal channel frames each of which is provided at its forward end with a laterally extending boss, a bumper arranged forwardly of the frames and adapted to be carried thereby, and means for mounting the bumper upon the frames comprising a pair of brackets, one secured to each frame, each having a part that abuts the frame boss to receive support therefrom, and means for holding the bracket to the frame, substantially as described.

4. In combination with a vehicle having a pair of longitudinal channel frames each of which is provided at its forward end with a laterally extending boss, a bumper arranged forwardly of the frames and adapted to be carried thereby, means for mounting the bumper upon the frames comprising a pair of brackets, one secured to each frame, and each having a forward part that abuts the frame boss to receive support therefrom, and having a rearward part that underlies the frame, and means for holding the bracket to the frame, substantially as described.

5. In combination with a vehicle having a pair of longitudinal channel frames, a bumper arranged forwardly of the frames and adapted to be carried thereby, and means for securing the bumper to the frames comprising a pair of brackets, one secured to each frame, and each having duplex means, one forwardly of the other, the forward means coöperating with the frames to prevent downward movement of the forward end of the bracket, and the rearward means coöperating with the frames to prevent upward movement of the rearward end of the bracket, and means for holding the bracket to the frame, substantially as described.

6. In combination with a vehicle having a pair of longitudinal channel frames each of which is provided with a laterally extending boss at its forward end, a bumper arranged forwardly of the frames and adapted to be carried thereby, and means for mounting the bumper upon the frames comprising a pair of brackets, one for each frame, each of which is provided at its rear with a part that underlies the frame, and at its front with another part that rests upon the boss, means for holding each bracket to its associated frame to receive constant support therefrom, a head formed at the forward end of each bracket, there being also a cylindrical bearing therein, and duplex bumpers carried by the brackets, one bumper having its ends secured to the heads of the two brackets and the other bumper being rotatably journaled within the bearings of the two brackets, and means carried by said rotatable bumper adapted for projection between the forward wheels of the vehicle to prevent the same from being steered, substantially as described.

7. In combination with a vehicle having a pair of longitudinal channel frames, a bracket secured to each frame, and means for supporting between said brackets a pair of bumpers, one ahead of the other, the rearward bumper being rotatably supported and having means that are adapted to be projected between the forward wheels of the vehicle to prevent the same from being steered, and key-controlled means for normally preventing retraction of said means from such interfering position, substantially as described.

FRANK R. PROCUNIER.

Witness:
EPHRAIM BANNING.